United States Patent [19]
Edlin

[11] 3,774,648
[45] Nov. 27, 1973

[54] POROUS PLASTIC STRUCTURES HAVING APERTURES

[75] Inventor: Frank E. Edlin, Tempe, Ariz.

[73] Assignee: International Plastics, Inc., Colwich, Kan.

[22] Filed: Sept. 25, 1970

[21] Appl. No.: 75,762

Related U.S. Application Data

[62] Division of Ser. No. 682,210, Nov. 13, 1967, Pat. No. 3,558,753.

[52] U.S. Cl............... 138/177, 138/178, 161/159, 161/160, 161/161, 161/168, 260/2.5 H, 260/2.5 HB, 260/2.5 P

[51] Int. Cl......... B32b 3/12, B32b 3/26, B32b 5/18

[58] Field of Search................. 138/178; 260/2.5 H, 260/2.5 HB, 2.5 P; 264/54; 161/159, 160, 161/168, 161, 109

[56] References Cited
UNITED STATES PATENTS

| | | | |
|---|---|---|---|
| 2,697,255 | 12/1954 | Lindemann | 260/2.5 P |
| 3,344,092 | 9/1967 | Pavuk | 264/54 |
| 3,520,836 | 7/1970 | Spielau | 260/2.5 P |
| 2,814,529 | 11/1957 | Arnt | 138/178 |
| 2,870,489 | 1/1959 | Rockoff | 260/2.5 H |
| 2,891,016 | 6/1959 | Kern et al. | 260/2.5 R |
| 3,154,605 | 10/1964 | Meyer et al. | 260/2.5 H |
| 3,293,196 | 12/1966 | Nakamori | 260/2.5 HB |
| 3,386,878 | 6/1968 | Pooley | 161/188 |
| 3,415,714 | 12/1968 | Hider | 161/161 |
| 3,488,299 | 1/1970 | Sato | 260/2.5 HB |

Primary Examiner—William J. Van Balen
Assistant Examiner—Stanley S. Silverman
Attorney—John H. Widdowson et al.

[57] ABSTRACT

Molding powder of a polymeric resin having intrinsic acid properties, such as acrylonitrile - butadiene - styrene terpolymer, is admixed with a decomposable chemical compound to produce a resulting mixture which is then extruded to form an extrudate. The extrudate is passed through a reduced pressure cooling zone while still in a semi-molten state to remove the gaseous components of the decomposed chemical compound. Upon removing the solidified extrudate from the reduced pressure cooling zone a porous article is produced immediately and without further processing.

4 Claims, 3 Drawing Figures

3,774,648

POROUS PLASTIC STRUCTURES HAVING APERTURES

This application is a division of Ser. No. 682,210 filed Nov. 13, 1967, now U. S. Pat. No. 3,558,753.

This invention relates to resinous, polymeric products and the method of making the same. In one aspect, this invention relates to porous resinous, polymeric products and the method of making the same. In another aspect, this invention relates to a method for producing a porous article formed of a polymeric resin having intrinsic acid properties. In another aspect, it relates to a method of producing a porous article of a polymeric resin having intrinsic acid properties by admixing 0.5 to 25 weight percent of a decomposable chemical compound with said polymeric resin molding powder, extruding the resulting mixture, and passing the extrudate while in a semi-molten state through a reduced pressure cooling zone to remove the decomposable chemical compound thus producing the desired porous product. In yet another aspect it relates to a method for producing a porous article having up to 200,000 pores per square inch through the article and wherein the porosity is readily controlled. In another aspect, it relates to a porous article produced from acrylonitrile - butadiene - styrene terpolymer. In yet another aspect it relates to a microporous article produced from acrylonitrile - butadiene - styrene terpolymer wherein the micropores through the article can be made as small as 0.2 micron in diameter.

Articles produced from molding powders are well-known in the art. However, most of the molding powders of the prior art form porous articles in which the porosity cannot be controlled. Articles produced from the well-known molding powders of the prior art incorporate fillers and other additives therein to provide the uncontrolled porosity of the produced articles.

Articles produced from polymeric resins having intrinsic acid properties such as acrylonitrile - butadiene - styrene terpolymers are likewise known and possess the distinct advantage over articles produced by other resins in that the articles produced from such polymeric resins having intrinsic acid properties do not suffer from the disadvantage of the prior resins in that they are nonporous. In many applications it is desirable to produce a porous article having a controlled porosity. However, due to the previously mentioned deficiencies of resins in that the porosity cannot readily be controlled the resins are undesirable to produce a microporous structure. Therefore, means are constantly being sought to produce a microporous article wherein the porosity of the article can readily be controlled and the porosity can be reproduced exactly from one article to the next.

Further, the prior art methods for producing porous plastic articles provide for incorporating foreign solids into the article or resin, allowing the article to cool, and then removing the foreign solids with water or other solvents by outward diffusion at temperatures up to the boiling point of the solvent. The so produced plastic articles normally contain closed cells and a number of cells that still have some foreign particulate matter therein, or else the plastic article must be subjected to a very long and intensive leaching process whereby cell walls are destroyed, or else the total amount of foreign matter must be proportionally very large thus leaving a honeycomb and low density plastic article having greatly deteriorated physical properties and useful life.

Further according to the processes of the prior art, a considerable length of time for treatment with water or solvent is necessary in order to extract the particulate material and to make the article porous. This extensive leaching period is not only time consuming but is very costly, impractical in industrial application, and often produces an inferior product. Finally, it becomes impractical to produce thick sections of plastic materials, in the range of 1/4 to 1/2 inch thick, having microporosity that is produced by the solvent extraction of particulate material.

According to the present invention the above-mentioned drawbacks of the prior art are readily overcome and a porous article is produced from a polymeric resin having intrinsic acid properties wherein the porosity of the article can readily be controlled.

Further according to the present invention, a method for producing a porous article from a polymeric resin having intrinsic acid properties is provided by admixing from about 0.5 to 25 weight percent of the decomposable chemical compound with a molding powder of such polymeric resin for a sufficient period of time to form a substantially uniform resulting mixture. The resulting mixture is then introduced into an extruder and extruded at a sufficient temperature and pressure to produce an extrudate and decompose the decomposable chemical compound. The gaseous products of the decomposed chemical compound are then withdrawn through the surface of the extrudate while the extrudate is in a semi-molten state thus producing a porous article wherein the porosity is readily controlled.

Further according to the invention, a porous article from a polymeric resin having intrinsic acid properties is produced wherein the decomposable chemical compound is a gas liberating agent such as the carbonates and bicarbonates of alkali and alkaline earth compounds as for example lithium, sodium, potassium, calcium, ammonium and the like. Excellent results are obtainable wherein the decomposable chemical compound is selected from the group consisting of sodium bicarbonate, sodium carbonate, sodium sulfate decahydrate, mixtures thereof, and the like. Highly hydrated salts are considered to undergo decomposition at temperatures which cause them to become dehydrated with the liberation of water vapor and said water vapor acts the same as a non-condensable gas at the temperatures of extrudates. However, hydrated salts are less effective generally than carbonate decompositions because of the usually lesser volume of gas generated therefrom. As an example of these relationships sodium bicarbonate decomposes generally above 212° F. to produce water vapor and sodium carbonate. The sodium bicarbonate or the sodium carbonate will react with any intrinsic acid properties of molten plastic to produce carbon dioxide and either carbonate will dissociate thermally about 515° F. to produce carbon dioxide. Most thermoplastics are extruded well below 515° F., necessitating an intrinsic acid property to evolve carbon dioxide. Both water vapor and carbon dioxide are useful in the process of this invention and render sodium bicarbonate doubly useful.

Decomposable compounds may be selected from organic materials which decompose into inert gases and examples of these are nitrogen from organic oxides and nitrides. Decomposable compounds may be selected from the metal hydrides such as lithium hydride which liberates hydrogen. The limiting requirements for a decomposable compound are that they decompose under the conditions of the extruder into a gas which is chemically inert to the plastic material and a residue which may or may not combine chemically with the plastic but which is not injurious to the plastic.

Further, according to the invention, a method for producing a porous article of an acrylonitrile - butadiene - styrene terpolymer is provided by admixing from about 0.5 to 25 weight percent sodium bicarbonate having a particle size of from about 0.2 to 10 microns in diameter with the acrylonitrile - butadiene - styrene terpolymer molding powder, extruding the same, and passing the extrudate, while in a semi-molten state, through a vacuum zone wherein water is sprayed upon the article thereby removing substantially all of the solid residue from the decomposed product of the sodium bicarbonate from said extrudate as well as gaseous decomposition products and thus recovering a porous acrylonitrile - butadiene - styrene terpolymer article.

Still further according to the invention, a porous acrylonitrile - butadiene - styrene terpolymer article is produced wherein the porosity of the said article is readily controlled.

The term polymeric resin having intrinsic acid properties used in the present disclosure encompasses those polymeric resins which possess acidic properties such that upon the addition of a decomposable chemical compound to the polymeric resin and subsequent heating of the resulting mixture at a temperature and pressure sufficient to extrude the mixture the decomposable chemical compound undergoes dissociation and/or a chemical reaction with the acidic properties of the polymeric resin thus creating vapors or gases which are then withdrawn to and through the surface of the extrudate. An example of such a polymeric resin having intrinsic acid properties is an acrylonitrile - butadiene - styrene terpolymer prepared in accordance with the procedure disclosed in U. S. Pat. No. 3,238,275. Another example of such a polymeric resin which can be employed by the present invention is the polyacrylates, such as methyl methacrylate. It is common then to remove part or most of the cations of the decomposable material which has reacted with the intrinsic acid properties of the plastic by chemical interaction with or hydrolysis by water while the extrudate is hot and is in the vacuum-water spray chamber. Thus the plastic material is essentially returned to its original chemical composition.

Porous plastic articles of the present invention have been produced in the form of a pipe which may subsequently be buried in the ground in the root zone in a row of growing crops and these crops may be fed water and fertilizer to their exact needs and without waste. The pipe contains a sufficient number of apertures for the permeation of the desired amount of water and fertilizer, and the apertures are too small to permit entry and plugging by roots. Coated fabrics, ceramic and clay pipes have been made in short sections having these properties, but it is economically prohibitive to consider such installations by the acre or for a farm.

Further, the porous article produced by the present invention can be employed to remove minute particles of solid matter from water by permeation of the water through the pipe. Although there are various filtering materials known, none can be as easily and economically produced as can the porous article of the present invention. Likewise, soot, smoke, and other materials of combustion from an air-stream can likewise be removed by employing a microporous article of the present invention as a filter. Sheets of plastic material as thick as desired may be extruded and used in a variety of ways such as a porous filter medium or an evaporative cooler. These sheets may be extruded also with interior channels for the conveyance of either a suspension or a filtrate.

Therefore, the porous article produced by the present invention is very useful in many aspects, economical to produce, and is an article wherein the porosity of the article can readily be controlled.

An object of the present invention is to produce a porous article wherein the porosity is readily controlled.

Another object of the invention is to provide a porous article formed from a polymeric resin having intrinsic acid properties.

Another object of the invention is to provide an economical, efficient method of producing a porous article formed from a polymeric resin having intrinsic acid properties.

Another object of the invention is to provide a porous article formed from an acrylonitrile - butadiene - styrene terpolymer wherein the porosity can readily be controlled depending upon the desired use of said article.

Various other objects, advantages, and features of the invention will become apparent to those skilled in the art from a reading of this disclosure.

Drawings accompany and are a part of this disclosure. These drawings depict preferred specific embodiments of the method of producing a porous article and a product so produced of the invention, and it is to be understood that these drawings are not to unduly limit the scope of the invention. In the drawings.

Figure 1:
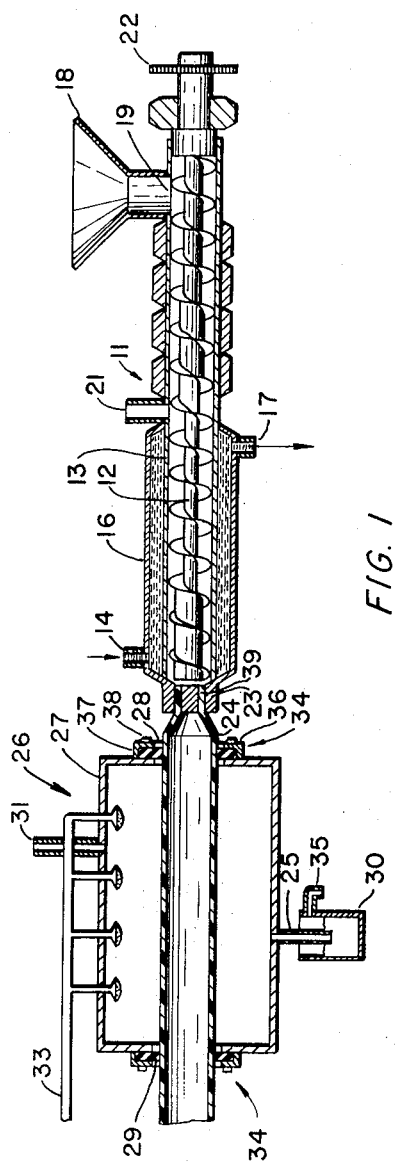
FIG. 1 is a schematic representation of an extruder used in producing the porous article of the present invention.

In the following is a discussion and description of the invention made with reference to the drawings whereupon the same reference numerals are used to indicate the same or similar parts and/or structure. The discussion and description is of preferred specific embodiments of the new method of making porous articles and the articles so produced of the invention, and it is to be understood that the discussion and description is not to unduly limit the scope of the invention.

With reference now to the drawings, and more particularly to FIG. 1, there is shown an extruder 11 having a forwarding screw 12 rotatably mounted in barrel 13 heated by means of a circulating hot fluid, such as circulating hot oil. Circulating hot oil is introduced through inlet 14 and circulates within jacket 16 surrounding barrel 13 and exits through outlet 17. Barrel 13 of extruder 11 is fitted with a tangentially situated feed hopper 18 having feed port 19 situated at the base thereof, inlet 21 for the introduction of gas therethrough, and suitable gear means 22 for driving screw 12. Die head 23 is positioned adjacent the downstream end portion of barrel 13 and screw 12, and maintained therein by any suitable means which are well known in the art. The screw of the extruder may be driven by any suitable means, for example, an electric motor, not shown.

Extrudate 24, formed by the extrusion of the semi-molten material passing through extruder 11 is adapted to be introduced through a reduced pressure cooling zone 26 while extrudate 24 is in a semi-molten state thus producing a porous article exiting from reduced pressure cooling zone 26.

Reduced pressure cooling zone 26 is shown as a vacuum chamber 27 having an inlet 28, and outlet 29 so as to allow extrudate 24 to pass therethrough. Vacuum chamber 27 is also provided with a conduit 31 which communicates with the interior of vacuum chamber 27 and is connected to a vacuum source (not shown), and an outlet conduit 25 which communicates with the interior of vacuum chamber 27 at one end and the other end is positioned within chamber trap 30. Outlet conduit 25 is positioned below the liquid level within trap 30 so as to maintain a vacuum with reduced pressure cooling zone 26. As liquid is passed through conduit 25 and into trap 30 it rises therein until it flows through conduit 35 which leads to a sewer not shown. As can readily be seen the use of chamber trap 30 and sealing means 34 allow a vacuum to be created on the walls of extrudate 24 positioned therein. A plurality of water spray nozzles 32 are shown positioned within the interior of vacuum chamber 27 so as to provide a water spray upon the extrudate thus facilitating the cooling of the same. Water spray nozzles 32 are connected to conduit 33 which in turn is connected to a water source supply (not shown). In extruding a pipe or other closed vessel it will be apparent that the extended end of the pipe must be kept open to the atmosphere or otherwise a vacuum will be applied through the pipewall to the extruder die and the semi-molten extrudate will be collapsed by the internal vacuum at the die.

Sealing means 34 is mounted on the exterior surface of vacuum chamber 27 so as to form a semi-seal between extrudate 24 and inlet 28 and outlet 29 of vacuum chamber 27, thus allowing a vacuum to be applied to the extrudate positioned within the vacuum chamber. Desirable results have been obtained wherein sealing means 34 comprises a flexible rubber sheet 36 having an opening therein and the diameter of the opening is of sufficient size to allow a clearance of about 1/16 − 1/8 inch between extrudate 24 and rubber sheet 36. Rubber sheet 36 is maintained in position on vacuum chamber 27 by means of plate 37 and bolt 38.

In the operation of the process for preparing the porous plastic structure of the present invention, a polymeric resin having intrinsic acid properties, such as a terpolymer of acrylonitrile - butadiene - styrene, is admixed with a decomposable chemical compound to produce a uniform resulting mixture which is then introduced into extruder 11 through hopper 18 and feed port 19. Screw 12 driven by a suitable means takes the mixture of acrylonitrile - butadiene - styrene terpolymer and decomposable chemical compound from feed port 19 through barrel 13 which is heated by means of circulating hot oil passing through jacket 16 surrounding barrel 13. During this period, the mixture is forced into intimate and substantial sliding contact with the hot barrel walls and is also sheared and worked whereby frictional effects are produced. The combined effect of the heated barrel and the heat due to internal friction in the material cause the mixture to be molten by the time it has traveled the distance of the extruder barrel, thus assuring that it may be forced through restriction 39 in die head 23 where the mixture is given the desired form.

As the molten mixture proceeds through barrel 13 of extruder 11 the decomposable chemical compound is decomposed therein, but during the retention time of the mixture within the extruder the decomposition products are dissolved within the resin matrices at the pressures under which the extruder is operated. When the extrudate is subjected to the atmosphere while in a semi-molten state, a portion of the decomposition products in the form of a gas or vapor exit from the extrudate, but at the same time a portion of the decomposition products are maintained within the extrudate. The extrudate so formed is then subjected, while in a semi-molten state, to reduce pressure cooling zone 26 wherein water and vacuum are employed in combination to remove substantially all of the remaining decomposition product thus producing an extrudate having a controlled porosity, as well as a uniform porosity, from a polymeric resin having intrinsic acid properties. Excellent results have been obtained where the vacuum applied to the reduced pressure cooling zone is in the range of about 2 to 3 inches of water and the cooling zone is at least 4 feet in length. The additional vacuum applied on the reduced pressure cooling zone and length of the reduced pressure cooling zone combine to insure removal of substantially all of the decomposed chemical compound and thus produces an article as desired.

The decomposable material as a solid is ground or reduced to a discrete particle size which is approximately the size of the desired pores. That is, particles which are about 2 microns in diameter produce pores that are about two microns in diameter. The number of pores which pass through the plastic material is considerably less than the number of particles in the material.

The relatively large number of pores is related to the pressures involved. Pressures of molten plastic within a well designed extruder with commercially close tolerances have been measured in excess of 7,000 pounds per square inch. Gases which are evolved from decomposition are at least highly compressed and usually dissolved in the plastic mass. Immediately after the plastic passes the die these gasses decompress and travel to the atmosphere through both surfaces. A change in surface texture of the plastic is easily observed visually an inch or a little more after the die. The interior becomes more porous or honeycomb-like than the exterior surface and micropores from the interior to both outer surfaces are more complete and extensive. Although the pressure difference which is applied subsequently with vacuum is very modest compared to that across the die the vacuum does contribute to porosity by pulling outward the entrapped gas bubbles to the surface before the plastic becomes rigid. The vacuum step is made more efficient by drawing the extrudate in the direction of extrusion usually by a factor of two to four fold.

Figure 3:
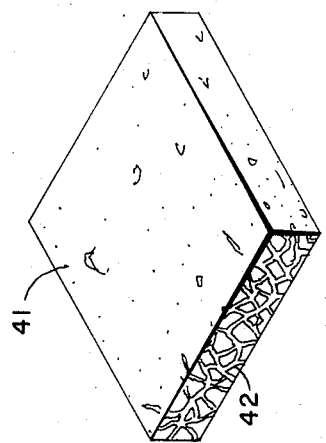
FIG. 3 is an enlarged schematic representation of a porous sheet of the present invention.
Figure 2:
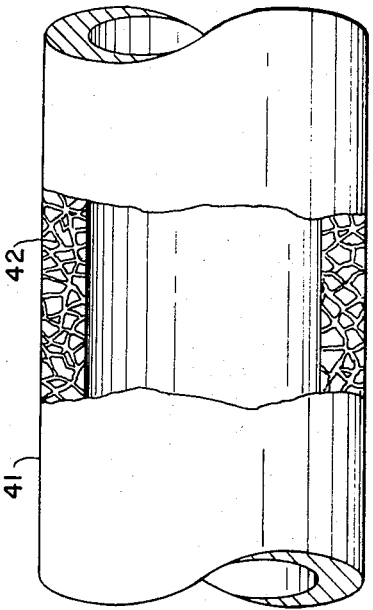
FIG. 2 is an enlarged schematic representation of a porous conduit of the present invention.

Rferring now to FIGS. 2 and 3 the porous article produced by the method of invention is shown. Porous article 41, shown as a conduit in FIG. 2 and a sheet of material in FIG. 3 is provided with a network of communicating channels 42 therein. As is readily apparent, article 41 has substantially all of the decomposable chemical compound removed therefrom thus providing a superior article and one wherein the degree of porosity can readily be controlled.

I have found that by employing the method and composition of the present invention that as little as one-half of one percent decomposable chemical compound can be admixed with the polymeric resin having intrinsic acid properties to produce a porous article wherein the porosity is readily controlled and reproducable.

A preferred composition will consist of 98% by weight of acrylonitrile - butadiene - styrene terpolymer and 2% by weight of sodium bicarbonate which has been ground in a ball mill to an average particle size of one micron. The sodium bicarbonate powder is adhered to the molding powder with a small amount of partially polymerized liquid of the composition of the terpolymer. One pound of this mixture should contain about 1,015 particles of sodium bicarbonate. When this pound of material is extruded into a sheet of 0.050 inch in thickness I measure about $5 \times 10^6$ holes through the plastic. About one particle in 700 particles produces a pore.

In order to more fully understand the invention the following examples are set forth showing the particular advantages of the invention. However, these examples are merely for purposes of illustration and such are not to unduly limit the scope of the present invention.

EXAMPLE

A series of runs was conducted wherein a decomposable chemical compound was admixed with various types of commercial grade molding powder resins. The particle size of the decomposable chemical compound was substantially the same in all cases. The screw speed, screw temperature, and die temperature were varied depending upon the particular molding powder being employed. The extrudates produced in each run were then examined and checked for porosity by water permeation and air permeation of the same. In the following table all runs were conducted using sodium bicarbonate as the decomposable chemical compound and the die and extruder head were operated at a temperature from about 15 – 20 degrees F. cooler than the extrusion screw and body. Although the weight percent of sodium bicarbonate was varied in the runs the particle size of the sodium bicarbonate was substantially the same in all runs, i.e., 2 – 3 microns in diameter.

The above data clearly illustrates that by employing the process of the present invention for producing a porous article that the porosity of the article so produced can readily be controlled and reproduced by admixing a polymeric resin having intrinsic acid properties with a decomposable chemical compound and then subsequently extruding the same.

I have also found that the porosity of the pipe changes as the wall thickness of the same change when the same amount of decomposable chemical compound is employed. The porosity inversely varies about as the square of the wall thickness. The following table illustrates the results from three runs wherein 2.25 weight percent sodium bicarbonate was admixed with a molding powder of acrylonitrile - butadiene - styrene terpolymer.

| Wall Thickness (inch) | Water Rate (gal/100 ft/hr) |
|---|---|
| 0.30 | 5.0 |
| 0.45 | 2.2 |
| 0.65 | 1.2 |

The foregoing discussion and description has been made in connection with preferred specific embodiments of the process for making porous articles and the articles so produced of the invention. However, it is to be understood that the discussion and description is only intended to illustrate and teach those skilled in the art how to practice the invention, and such is not to unduly limit the scope of the invention, which is defined in the claims set forth hereinafter.

I claim:

1. A porous article formed of a mixture of a polymeric resin selected from the group consisting of polyvinyl chloride, acrylonitrile-butadiene-styrene, and methyl methacrylate and from about 0.5 to 25 weight percent of a thermally decomposable chemical compound having from about 5,000 to 200,000 apertures per square inch therein, each of said apertures having a diameter in the range of from about 0.3 to 10 microns.

2. The porous article according to claim 1 wherein said article is a conduit formed of a mixture of acrylonitrile-butadiene-styrene polymer and from about 0.5 to 25 weight percent sodium bicarbonate, said conduit having about 6,000 to 25,000 aperatures per square inch therein, and each of said aperatures having a diameter in the range of 0.3 to 5 microns.

TABLE I

| Resin | Temperature, °F. Screw | Temperature, °F. Die | Weight percent, sodium bicarbonate | Water[1] permeation rate | Air[2] permeation rate |
|---|---|---|---|---|---|
| Polystyrene | 430–450 | 410–420 | 2.25 | 0.2 | 0.1 |
| Polypropylene | 400–420 | 380–400 | 2.25 | 0.5 | 0.2 |
| Polyethylene | 340–360 | 320–340 | 2.25 | 0.1 | 0.1 |
| Methyl methacrylate | 380–400 | 360–380 | 2.25 | 2.1 | 1.9 |
| Polyvinylchloride | 370–380 | 350–360 | 2.25 | 1.8 | 1.7 |
| ABS[3] | 430–450 | 405–420 | 0 | 0.01 | 0.01 |
| ABS[3] | 430–450 | 405–420 | 0.5 | 0.5 | 1.0 |
| ABS[3] | 430–450 | 405–420 | 1.4 | 3.2 | 5.5 |
| ABS[3] | 430–450 | 405–420 | 2.25 | 9 | 8.8 |
| ABS[3] | 430–450 | 405–420 | 8 | 32 | 24.8 |
| ABS[3] | 430–450 | 405–420 | 12.5 | 41 | 33 |
| ABS[3] | 430–450 | 405–420 | 25 | 55 | 48 |
| 1:1 ABS polystyrene mixture | 420–450 | 405–420 | 2.25 | 1.6 | 1.8 |
| 1:4 Polypropylene—polyethylene mixture | 340–420 | 320–400 | 2.25 | 0.8 | 0.6 |

[1] Water permeation rates were measured as gal.-/hr. 100 lineal feet of pipe which had an O.D. of .665 inch and a wall thickness of 0.045, using a constant pressure head of water equivalent to 24''.

[2] Air permeation rates determined by amount of air passing through a pipe per 100 lineal ft. having an O.D. of 0.665 inch and a wall thickness of 0.045 using an air pressure of 12 p.s.i.

[3] ABS—acrylonitrile-butadiene-styrene terpolymer, commercial grade #600 manufactured by Goodyear Tire & Rubber Co., and equivalent.

3. The porous article according to claim 2 wherein said aperatures in said conduit have a diameter in the range of from about 2 to 4 microns.

4. The porous article of claim 1 wherein said article is a sheet formed of a mixture of acrylonitrile-butadiene-styrene polymar and from about 0.5 to 25 weight percent sodium bicarbonate, said sheet having about 6,000 to 150,000 apertures per square inch therein and each of said apertures having a diameter in the range of 0.3 to 5 microns.

* * * * *